Dec. 24, 1929.  E. G. GARTIN  1,740,686
DRILLING MOTOR
Filed July 23, 1923
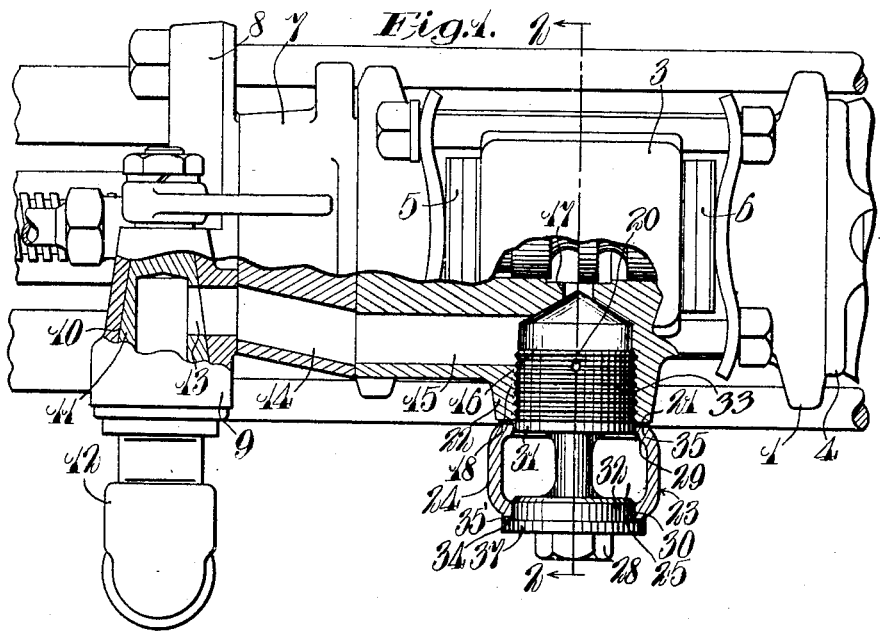
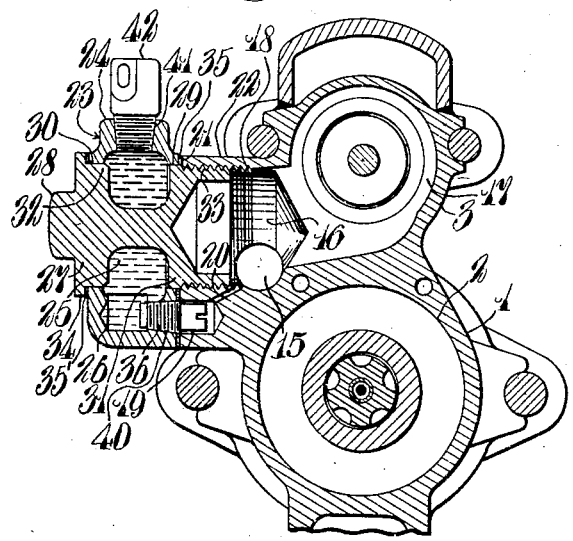
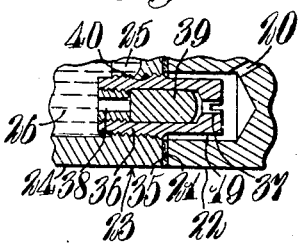
Inventor
Elmer G. Gartin.
by
atty.

Patented Dec. 24, 1929

1,740,686

UNITED STATES PATENT OFFICE

ELMER G. GARTIN, OF CLAREMONT, NEW HAMPSHIRE, ASSIGNOR TO SULLIVAN MACHINERY COMPANY, A CORPORATION OF MASSACHUSETTS

DRILLING MOTOR

Application filed July 23, 1923. Serial No. 653,103.

My invention relates to drilling motors and more particularly to lubricating and fluid supply arrangements for drilling motors.

An object of my invention is to provide an improved drilling mechanism. Another object of my invention is to provide an improved drilling mechanism having improved fluid supply and lubricating arrangements. A further object of my invention is to provide an improved and readily assembled drilling motor having improved lubricating mechanism associated therewith. Other objects and advantages of my invention will hereinafter more fully appear.

In the accompanying drawings I have shown for purposes of illustration one form which my invention may assume in practice.

In these drawings,—

Fig. 1 is a plan view with parts broken away showing the fluid supply passages.

Fig. 2 is a transverse vertical section on the line 2—2 of Fig. 1.

Fig. 3 is an enlarged detail sectional view through the automatic lubricator.

In the form of my invention which I have disclosed for purposes of illustration, there is shown at 1 a member which constitutes herein a combined cylinder and valve chest member, there being formed within the member 1 a cylinder bore 2 and a valve chamber 3. A front head 4 is provided to close the cylinder bore 2 and the opposite ends of the valve chamber 3 are closed by heads 5 and 6, (see Fig. 1). To the rear of the cylinder member is arranged an intermediate head member 7 and a second head member 8, the latter carrying a valve enclosing boss 9 thereon. Within the boss 9 is a conical recess 10 which contains a conical valve 11 adapted to control the supply of fluid pressure from a line 12 through a port 13 and through passages 14 and 15 formed respectively in the head member 7 and the member 1. The passage 15 at its forward end, herein at about the center of the length of the cylinder, communicates with an enlarged recess 16 which is connected through a passage 17 with the valve chest 3. The chamber 16 is internally threaded at its mouth, as at 18, for a purpose which is hereinafter described. Adjacent the recess or chamber 16 is a second smaller chamber 19 which is connected by a small passageway 20 so that it may conduct lubricant to the passages 15, 16 and 17. A shoulder 21 is formed by the outer surface of a boss 22 in which the chamber 16 is partially formed. A lubricant supply reservoir is generally indicated at 23 and is made up of a member 24 which provides a space 25 within its interior and a communicating enlargement 26 whose purpose will be apparent hereafter. A member 27 having a polygonal lug 28 for the ready application of a wrench is arranged to secure the member 24 in position and to constitute the remaining walls of the lubricant reservoir. It will be noted that the member 24 is provided with alined openings 29 and 30 of which the latter is the larger and these cooperate with cylindrical portions 31 and 32 formed upon the member 27. The member 27 also comprises a portion 33 which is threaded to cooperate with the threaded portion 18 previously described. The member 27 finally comprises an annular shoulder 34 which is adapted to force the member 24 tightly towards the shoulder 21, there being preferably gaskets 35 and 35' arranged between the shoulder 21 and the member 24 and the member 24 and the shoulder 34 to insure against leakage. A lubricator plug 36 having openings 37 and 38 in its opposite ends and provided in its interior with a controlling member 39 which is freely reciprocable within the interior of the member 36 in accordance with fluid pressure variations, is threaded as at 40 into the member 24 so that the passage 38 communicates with the portion 26 of the chamber 25 previously described. The free end of the member 36 projects into the auxiliary chamber 19 previously described. A threaded opening 41 closed by a plug 42 is provided to permit filling of the chamber 25.

The mode of operation of this mechanism will be clearly apparent. Fluid pressure is supplied through the port 13 and passages 14 and 15 to the recess or chamber 16 from which it passes through the port 17 into the valve recess 3 and is then distributed in a well known manner to the opposite ends of the cylinder. The lubricant reservoir being filled with oil, the fluctuations in pressure in the valve recess 3 and the chamber 16 will cause a gradual feeding of lubricant from the chamber 25 through the member 36 and passage 20 into the air supply and accordingly the valve as well as the remaining portions of the motor will be adequately lubricated. It has been found in practice that no port is requisite through the member 39 if the speed of reciprocation of this member is extremely high as is the case with the mechanism illustrated where the member 39 makes two complete reciprocations for each of the very large number of reciprocations of the motor piston, the very small clearance around the member 39 sufficing to permit the supply of lubricant in the requisite quantity.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a motor lubrication system, a motor body member containing a chamber in which a fluctuation in pressure occurs as the motor runs, said body member having an internally threaded recess communicating with said chamber and an adjacent smaller recess also communicating with said chamber, and means for supplying lubricant to said chamber comprising a lubricant reservoir and a lubricator, the former held in position by said threads and the latter projecting into said smaller recess.

2. In a motor lubrication system, a motor body member containing a chamber in which a fluctuation in pressure occurs as the motor runs, said body member having an internally threaded recess communicating with said chamber and an adjacent smaller recess also communicating with said chamber, and means for supplying lubricant to said chamber, comprising means forming a lubricant reservoir and threadedly engaged with said first mentioned recess and means communicating with said reservoir for conducting lubricant from the latter to said smaller recess.

3. In a motor lubrication system, a motor body member containing a chamber in which a fluctuation in pressure occurs as the motor runs, said body member having an internally threaded recess communicating with said chamber and an adjacent smaller recess also communicating with said chamber, and means for supplying lubricant to said chamber comprising a hollow member having openings in its opposite sides, a member having portions closing said openings and a threaded portion engaging said threaded recess, and a lubricator communicating with said hollow member and projecting into said second mentioned recess.

4. In a motor lubrication system, a motor body member containing a chamber in which a fluctuation in pressure occurs as the motor runs, said body member having an internally threaded recess communicating with said chamber and an adjacent smaller recess also communicating with said chamber, and means for supplying lubricant to said chamber comprising a hollow member having openings in its opposite sides, a member having portions closing said openings and a threaded portion engaging said threaded recess, said members cooperating to form a lubricant reservoir, and a lubricator communicating with said reservoir and projecting into said second mentioned recess.

5. In a motor lubrication system, a motor body member containing a chamber in which a fluctuation in pressure occurs as the motor runs, said body member having an internally threaded recess communicating with said chamber and surrounded at its mouth by a shoulder and an adjacent smaller recess also communicating with said chamber, and means for supplying lubricant to said chamber comprising a hollow member having openings in its opposite sides, a member having portions closing said openings and a threaded portion engaging said recess, said last mentioned member drawing said hollow member against said shoulder, and a lubricator communicating with said reservoir and threaded into said hollow member and so disposed as to project into said second mentioned recess.

In testimony whereof I affix my signature.

ELMER G. GARTIN.